Sept. 29, 1925.
F. J. WEST
STORAGE BATTERY
Filed April 15, 1922
1,555,046
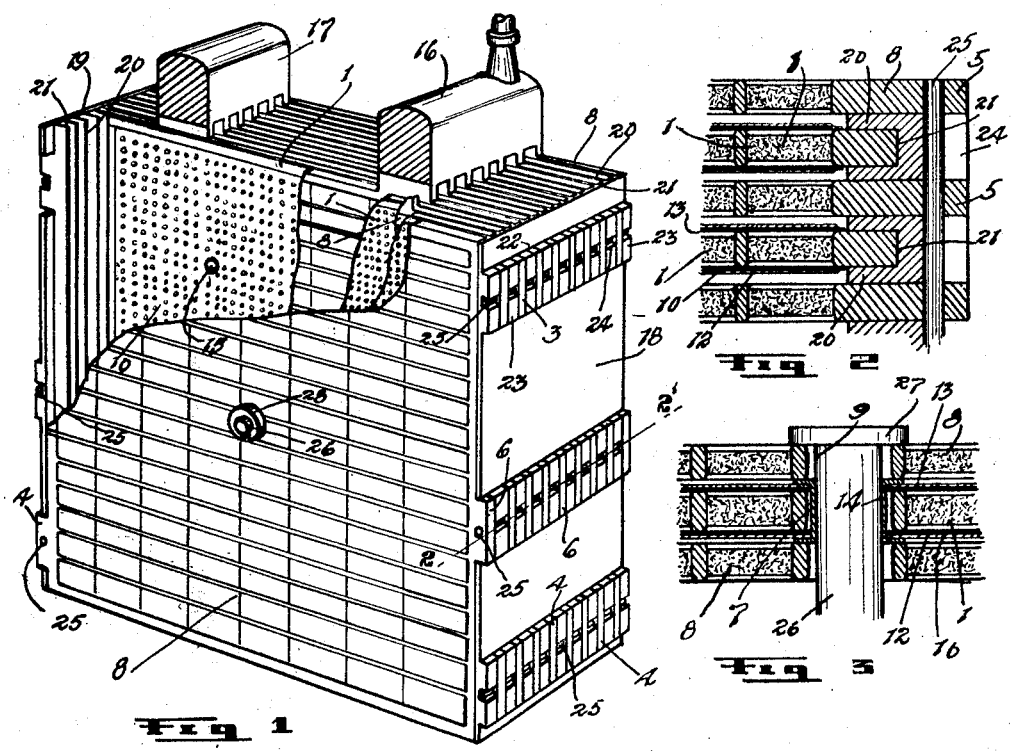
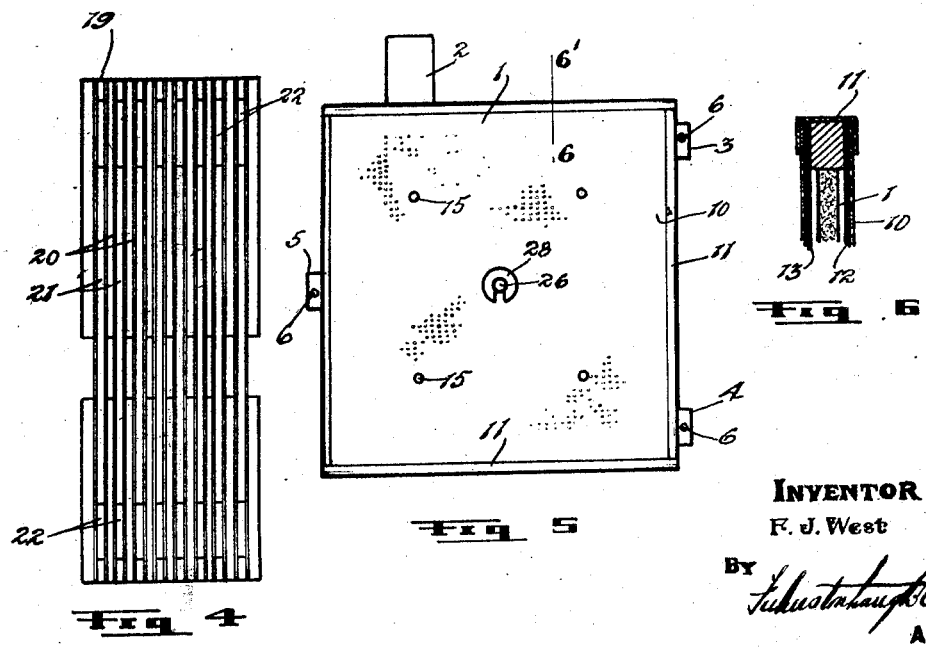
INVENTOR
F. J. West
BY
ATTYS Patented Sept. 29, 1925.

1,555,046

UNITED STATES PATENT OFFICE.

FREDERICK JAMES WEST, OF WINNIPEG, MANITOBA, CANADA.

STORAGE BATTERY.

Application filed April 15, 1922. Serial No. 553,032.

*To all whom it may concern:*

Be it known that I, FREDERICK JAMES WEST, of the city of Winnipeg, in the Province of Manitoba, Canada, have invented certain new and useful Improvements in Storage Batteries, of which the following is the specification.

The invention relates to improvements in storage batteries and an object of the invention is to provide a storage battery, the various parts of which can be quickly assembled or dismounted and arranged such that the interior parts of the battery can be removed as a unit from the casing.

A further object is to arrange the battery parts so that there is no possibility of internal short circuiting.

A still further object of the invention is to enclose the positive electrodes or plates in a separator casing or envelope which not only positively separates the positive and negative plates, but prevents the loosening and scaling off of the active material of the positive plate and thereby not only materially increases the life of the positive electrode but prevents the accumulation of sediment in the bottom of the battery.

A further object of the invention is to construct the battery such that there is no tendency for the plates to buckle.

With the above more important objects in view the invention consists essentially in the arrangement and construction of parts hereinafter more particularly described and later pointed out in the appended claims, reference being had to the accompanying drawing in which:

Fig. 1 is a perspective view of the assembled interior parts of the battery, certain parts being broken away to expose construction.

Fig. 2 is an enlarged detailed horizontal sectional view at 2—2′ Fig. 1.

Fig. 3 is an enlarged detailed horizontal sectional view through a number of plates and showing one end of the central fastening rod passing therethrough.

Fig. 4 is an interior view of one of the end members.

Fig. 5 is a face view in reduced scale of one of the positive plates.

Fig. 6 is an enlarged detailed sectional view at 6—6′ Fig. 5.

In the drawings like characters of reference indicate corresponding parts in the several figures.

The present invention relates particularly to the interior parts of a battery and in this connection it is to be understood that the parts embodying what might be termed the battery unit as hereinafter described are immersed in the electrolyte which is contained in the casing.

The positive plates or electrodes 1 of my battery unit are of the usual grid formation with the paste or active material applied on the grid. The grid is supplied at the top with an extending terminal 2 and at one end with two spaced upper and lower end lugs 3 and 4 and at the other end with a centrally positioned end lug 5, the lugs being provided with cross openings 6 for a purpose later disclosed. Centrally the grid of each positive plate or electrode is supplied with an opening 7.

The negative plates or electrodes 8 are of the same grid type as the positive plates and are provided with the usual negative paste. The negative plates are also supplied with lugs corresponding to those 3, 4 and 5 of the positive plates and they are also provided centrally with an opening 9 adapted to take a position directly opposite the opening 7 of the adjoining positive plate.

The positive plates or electrodes are enclosed within a perforated acid resisting casing or envelope 10 formed in the present instance from celluloid, there being a sheet of celluloid at each side of the plate and connecting bands 11 spanning the edges of the plates and cemented to the edges of the side sheets. The lugs and the terminals protrude through the envelope. Between the side sheets of the envelope and the grid I insert asbestos or such like sheets or pads 12 and 13. There is no envelope containing the negative plates.

The positive plates are fitted with a central celluloid ferrule 14 which passes through the opening 7 in the grid, the end flanges of the ferrule acting to hold the envelope from spreading at this point. Celluloid pins or rivets 15 are also passed through the positive plates at intervals to hold the envelope sides together.

When a battery is being formed a selected number of positive plates are taken and placed side by side with the lugs 3 and 4 at one end directly opposite each other and then the terminals 2 are connected by a terminal bar 16 and a preselected number of negative plates are also taken and positioned a preselected distance apart and with the lugs 5 opposing and the terminals connected by a terminal bar 17. The positive and negative groups of plates so formed are then put together with a positive plate entered between each pair of negative plates and the arrangement is such that the lugs 3 and 4 of the positive plates are aligned at one end and alternated with the lugs 5 of the negative plates and the lugs 3 and 4 of the negative plates at the other end are aligned and alternated with the lugs 5 of the positive plates at that end.

Similar end members 18 and 19 are provided, these being formed from celluloid and each being provided on its inner side with a plurality of vertically extending spaced fins or wings 20. The fins provide vertically extending channels 21. The said end members are applied on the ends of the assembled electrodes, the channels 21 receiving the ends of the electrodes and the fins separating the positive and negative electrodes.

Openings 22 are formed in the bases of the channels, the openings passing through the end members and being adapted to receive the end lugs of the plates which protrude outwardly through the end members.

The outer faces of the end members 18 and 19 are provided with outstanding slotted ribs 23 the ribs being aligned and positioned at opposite sides of the openings 22 and having the slots 24 therein aligned with the openings 6 of the lugs. According to this arrangement it is a very easy matter to fasten the assembled electrodes and end members together by celluloid fastening pins 25 through the openings 6, the fastening pins lying in the slots. By having these pins making a tight fit the parts are permanently held together and can be lifted as a unit. Further, it is a very easy matter to dismount the parts by simply removing the pins 25.

I might here point out that owing to the manner in which the lugs of the positive and negative plates are staggered or alternated the pins 25 in each instance only connect plates of the same polarity and consequently there is no possibility of internal short circuit on account of the pins.

After the various parts have been assembled as above described I pass a comparatively long central pin 26 through the central openings of the positive and negative plates, this pin passing through the ferrules and being provided at one end with an enlarged head 27 and at the other end with a substantially U-shaped fastening clip or keeper 28. This pin 26 holds the plates firmly together at the centre and accordingly prevents buckling thereof.

From the above arrangement it will be seen that this battery can be very easily assembled or taken apart and that by virtue of the separator envelopes containing the positive electrodes the positive and negative plates are effectively separated and the paste or active element of the positive plates is positively prevented from loosening and scaling off.

What I claim as my invention is:

1. In a battery, spaced positive and negative electrodes, said electrodes being all provided at their ends with extending fastening lugs, similar end members located at the ends of the electrodes and provided with openings receiving all the lugs and insulating fastening pins located at the exterior sides of the end members and passing through all the lugs at that end.

2. In a battery, spaced positive and negative electrodes, said electrodes being provided at their ends with extending fastening lugs, said lugs being positioned such that the lugs of the grouped electrodes appear in horizontal rows and with the lugs of the negative electrodes staggered in respect to the lugs of the positive electrodes, similar end members located at the ends of the grouped electrodes and provided with openings through which the lugs extend, and insulating fastening pins located at the outer faces of the end members and extending through the horizontal rows of lugs.

3. In a battery, spaced positive and negative electrodes, said electrodes being provided at their ends with extending fastening lugs, said lugs being positioned such that the lugs of the grouped electrodes appear in horizontal rows and with the lugs of the negative electrodes staggered in respect to the lugs of the positive electrodes, similar end members located at the ends of the grouped electrodes and provided with openings through which the lugs extend, insulating fastening pins located at the outer faces of the end members and extending through the horizontal rows of lugs, and fins carried by the inner faces of the end members and extending between and separating the grouped electrodes.

4. In a storage battery, an end member of insulating material for spacing and connecting the electrodes, said member having spaced parallel vertical fins on the inner side thereof and forming vertical channels and openings provided in the end members between all fins and communicating with the channels, the openings in adjacent channels being in staggered relation and all openings appearing in aligned rows.

5. In a storage battery, an end member of insulating material for spacing and connecting the electrodes, said member having spaced parallel vertical fins on the inner side thereof and forming vertical channels and openings provided in the end members between all fins and communicating with the channels, the openings in adjacent channels being in staggered relation and all the openings appearing in aligned rows and slotted ribs formed on the outer side of the end member and appearing between the openings.

Signed at Winnipeg, this 14 day of March, 1922.

FREDERICK JAMES WEST.